United States Patent [19]

Ross et al.

[11] 4,110,817
[45] Aug. 29, 1978

[54] ELECTROLYTIC CAPACITOR WITH AN ELECTROLYTE INCLUDING DIBASIC ACID COMPOUNDS

[75] Inventors: Sidney D. Ross; Franz S. Dunkl, both of Williamstown, Mass.

[73] Assignee: Sprague Electric Company, North Adams, Mass.

[21] Appl. No.: 705,861

[22] Filed: Jul. 16, 1976

[51] Int. Cl.$^2$ .............................................. H01G 9/02
[52] U.S. Cl. .................................. 361/433; 252/62.2
[58] Field of Search ...................... 252/62.2; 317/230; 361/433

[56] References Cited

U.S. PATENT DOCUMENTS

| | | | |
|---|---|---|---|
| 3,293,506 | 12/1966 | Chesnot | 252/62.2 X |
| 3,346,782 | 10/1967 | Alwitt et al. | 252/62.2 X |
| 3,547,423 | 12/1970 | Jenny et al. | 252/62.2 X |
| 3,609,467 | 9/1971 | Curtis | 252/62.2 X |
| 3,702,426 | 11/1972 | Ross et al. | 252/62.2 X |
| 3,719,602 | 3/1973 | Anderson et al. | 252/62.2 |

FOREIGN PATENT DOCUMENTS 45-40,240  12/1970  Japan ..................... 252/62.2

*Primary Examiner*—Jack Cooper
*Attorney, Agent, or Firm*—Connolly and Hutz

[57] ABSTRACT

An aluminum electrolytic capacitor includes an electrolyte solute of ammonium succinate or ammonium adipate in combination with ammonium succinamate, succinamic acid, succinamide, or succinimide.

2 Claims, 2 Drawing Figures

ELECTROLYTIC CAPACITOR WITH AN ELECTROLYTE INCLUDING DIBASIC ACID COMPOUNDS

BACKGROUND OF THE INVENTION

This invention relates to an electrolytic capacitor having an oxide-coated aluminum electrode contacted by an electrolyte solution including an ammonium ester of a dibasic acid having 3 to 6 carbon atoms on its straight chain in combination with another dibasic acid compound having 3 to 6 carbon atoms on its straight chain.

Ammonium and amine salts of succinic and adipic acids have been employed as solutes in working electrolytes with aluminum electrodes to provide electrolytic capacitors which exhibit relatively low resistivity, support substantial anodic oxidation, and have acceptably low freezing points. However, it has been found that such electrolyte solutions increase in resistivity with time at the upper operating temperature of the capacitor.

SUMMARY OF THE INVENTION

It is an object of this invention to provide an aluminum electrolytic capacitor employing electrolyte solutes of succinic or adipic acid compounds which is not subject to substantial resistivity increase with time at operating temperature.

Another object of this invention is the provision of an aluminum electrolytic capacitor employing electrolyte solutes of succinic or adipic acid compounds which exhibit stable resistivity over the operating temperature range of the capacitor.

In general, an electrolytic capacitor of this invention including an aluminum electrode and an electrolyte having a solute of a mixture of an ammonium ester of a dibasic acid having from 3 to 6 carbon atoms in the straight chain with another compound of a dibasic acid having from 3 to 6 carbon atoms in the straight chain provides an electrolytic capacitor with improved stability.

More particularly, the electrolytic capacitor of this invention utilizes an oxide-coated aluminum electrode in contact with an electrolyte having a solute of ammonium succinate or ammonium adipate combined with ammonium succinamate, succinamic acid, succinamide, or succinimide.

DESCRIPTION OF THE PREFERRED EMBODIMENTS

Figure 1:
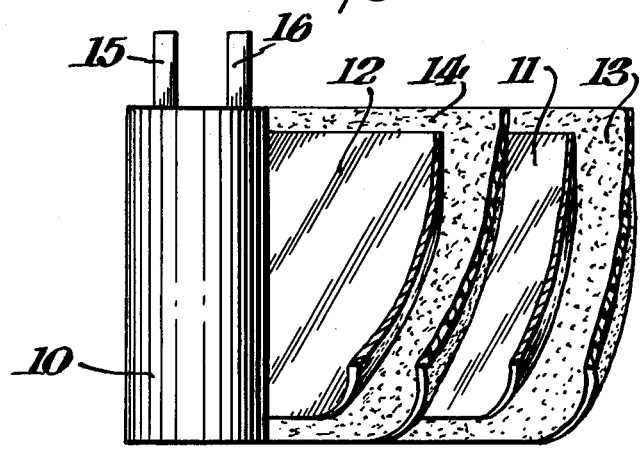
FIG. 1 represents a partial unwound electrolytic capacitor employing the electrolyte of this invention.

FIG. 1 illustrates a capacitor section 10 partially unwound having an anode 11 and a cathode 12. Anode 11 consists of capacitor grade aluminum foil, and cathode 12 consists of metal foil. Between anode 11 and cathode 12 in section 10 there are positioned porous spacers 13 and 14 of chemically inert material. The capacitor including spacers 13 and 14 is impregnated with the electrolyte according to this invention. The anode 11 has a connecting tab 15, and the cathode 12 a connecting tab 16. The capacitor section 10 may be housed in a conventional electrolytic capacitor container.

Figure 2:
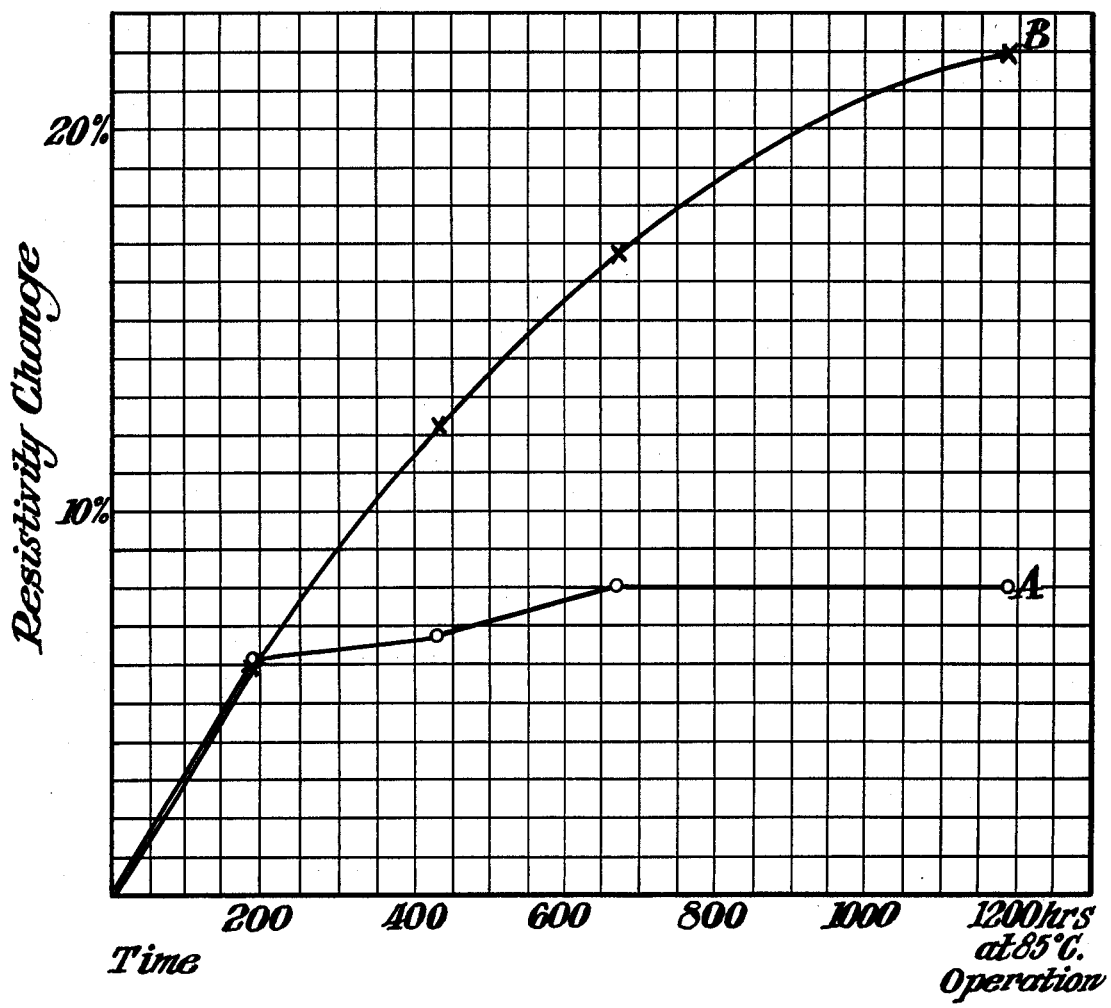
FIG. 2 shows a comparison of the percentage change of resistivity with time exhibited by capacitors of this invention and of the prior art.

FIG. 2 shows how the percentage change of resistivity of the electrolytes of this invention and the prior art vary with time of exposure to rated temperature (85° C). The graph shows electrolyte resistivity change in percent on the ordinate, and the hours of exposure to operating temperature on the abscissa. The resistivity curves A and B show that the improved electrolyte of this invention provides a lesser resistivity increase over a given period of operation.

Glycol solutions of ammonium and amine salts of succinic and adipic acids make excellent working electrolytes for electrolytic capacitors. They afford solutions of low resistivity (200–400 ohm-cm); they support anodic oxidation to good voltages (100–350V); they have acceptably low freezing points. They do suffer from one serious deficiency, in that the solutions increase in resistivity with time at the operating temperature of the capacitor (85° C–125° C).

With the composition of the present invention a more stable capacitor is achieved in which the resistivity of the working electrolyte according to this invention does not increase substantially over a period of use. Either ammonium succinate or adipate in combination with ammonium succinamate, succinamide, succinimide, or succinamic acid provides an electrolyte having a resistivity between 200 and 300 ohm-cm at room temperature after interreaction and before use as a capacitor electrolyte. This composition has a useful resistivity and stability over a period of use. Accordingly, a capacitor containing the reaction mixture of this invention in the electrolyte system stands up well as a working electrolyte under a voltage potential.

The following examples are illustrative of this invention and not limitative.

EXAMPLE I

A combination of ammonium succinate (10.4g), succinimide (4.0g) was mixed in ethylene glycol (81.5g) and water (4.1g) to provide Electrolyte A. A control of ammonium succinate (10.4g) was mixed in ethylene glycol (81.5g) and water (4.1g) to provide Electrolyte B. These Electrolytes A and B were heated at 125° C for 8 hours to produce an interreaction and were then contacted by formed aluminum anodes. Under test for resistivities during a period of operation under potential these electrolytes were found to have the following values:

| Elapsed Time | Electrolyte Resistivity | | | |
|---|---|---|---|---|
| | Electrolyte A | | Electrolyte B | |
| Hours at 85° C | Ohm-cm | % Change | Ohm-Cm | % Change |
| 0 | 312 | | 289 | |
| 190 | 331 | 6.1 | 306 | 5.9 |
| 430 | 333 | 6.7 | 324 | 12.1 |
| 670 | 337 | 8.0 | 337 | 16.6 |
| 1190 | 337 | 8.0 | 352 | 21.8 |

FIG. 2 shows graphically that the electrolyte of this invention (A) underwent a percentage change of resistivity of only 8% whereas the control electrolyte of the prior art (B) changed almost 22%.

EXAMPLE II

Ammonium succinate (11.4g) was mixed with ethylene glycol (95.4g) and water (4.7g) to provide a control Electrolyte C. A combination of ammonium succinate (11.4g) and succinimide (4.35g) was mixed in ethylene glycol (95.4g) and water (4.7g) and reacted to provide an Electrolyte D. A combination of ammonium succinate (11.4g) and ammonium succinamate (5.0g) was mixed with ethylene glycol (95.4g) and water (4.7g) and the mixture was reacted to provide an Electrolyte E. These electrolytes were introduced into aluminum electrolytic capacitors having film-formed aluminum anodes.

Under test for resistivities during a period of operation these electrolytes were found to have the following values:

| Elapsed Time | Electrolyte Resistivity in ohms-cm at 25° C | | |
|---|---|---|---|
| Hours at 85° C | Electrolyte C | Electrolyte D | Electrolyte E |
| 0 | 252 | 258 | 239 |
| 63 | — | — | 240 |
| 75 | 261 | 273 | — |
| 164 | 273 | 280 | 249 |
| 280 | 294 | 292 | 261 |
| 400 | 309 | 300 | 270 |
| 540 | 322 | 307 | 282 |

The increase of control Electrolyte C is 18% while the increase of Electrolyte D is 19% and that of Electrolyte E is 18%. Resistivity curves of electrolytes with various other combinations of compounds of dibasic acids were carried out with similar favorable results.

EXAMPLE III

A combination of ammonium succinate (11.4g), succinamic acid (8.8g) was mixed in ethylene glycol (95g) and water (5g) to provide an Electrolyte F. A control of ammonium succinate (11.4g) was mixed in ethylene glycol (95g) and water (5g) to provide Electrolyte G. Under test for resistivities during a period of operation these electrolytes were found to have the following values:

| Elapsed Time | Electrolyte Resistivity in ohms-cm at 25° C | |
|---|---|---|
| Hours at 85° C | Electrolyte F | Electrolyte G |
| 0 | 291 | 246 |
| 110 | 259 | 257 |
| 230 | 268 | 270 |
| 325 | 275 | 287 |
| 485 | 283 | 297 |
| 725 | 290 | 315 |
| 975 | 292 | 333 |

EXAMPLE IV

A combination of ammonium adipate (10g), succinamic acid (6.5g) was mixed in ethylene glycol (79.5g) and water (4g) to provide an Electrolyte H. A control of ammonium adipate (10g) was mixed in ethylene glycol (86g) and water (4g) to provide Electrolyte J. These Electrolytes H and J were exposed to formed aluminum anodes over extended periods of 85° C. Under test for resistivities during a period of operation under potential these electrolytes were found to have the following values:

| Elapsed Time | Electrolyte Resistivity in ohms-cm at 25° C | |
|---|---|---|
| Hours at 85° C | Electrolyte H | Electrolyte J |
| 0 | 307 | 264 |
| 240 | 283 | 315 |
| 520 | 306 | 352 |
| 1000 | 322 | 384 |

It is noted that the electrolyte of this invention (H) exhibited substantially constant resistivity with time, while the control electrolyte (J) showed large increases. The 500 hr. results are particularly interesting, in that our inventive electrolyte had essentially the resistivity of time 0, while the control had a 33% rise. The capacitors of this Example of the invention also showed a remarkably flat dissipation factor as compared to capacitors employing the control Electrolyte J. The increase in percentage dissipation factor after 500 hours for capacitors employing Electrolyte H was 0.76 as compared to 4.36 for control Electrolyte J.

EXAMPLE V

Electrolyte K of 9.8g of ammonium succinate and 4.2g of ammonium succinamate in 82g of ethylene glycol and 4g of water had an initial resistivity at 25° C of 239 ohms-cm. Electrolyte K supported oxide formation on the surface of an aluminum electrode at a maximum voltage of 325 volts at 25° C and 257 volts at 85° C.

Control Electrolyte L of ammonium succinate (10.4g), ethylene glycol (85.5g) and water (4.1g) has an initial resistivity at 25° C of 225 ohms-cm. Electrolyte J supported oxide formation on the surface of an aluminum electrode at a maximum voltage of 365 volts at 25° C and 260 volts at 85° C.

Control Electrolyte M of ammonium succinamate (9.1g), ethylene glycol (87g) and water (4g) had an initial resistivity at 25° C of 377 ohms-cm. Electrolyte M supported oxide formation on the surface of an aluminum electrode at a maximum voltage of 245 volts at 25° C and 330 volts at 85° C.

The present invention is not well understood, in the sense that we do not have a detailed understanding of how the additives we have described mitigate the adverse increases in resistivity that these electrolyte systems suffer. However, to fulfill the obligation of complete disclosure, it is our belief that the increases in resistivity on heating of the prior art electrolytes are due to the conversion of ammonium salts to amides. We can use the ammonium succinate system to illustrate:

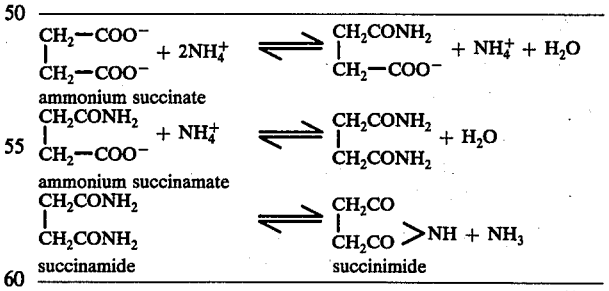

The above system of equilibria is simply a representation of the fact that an ammonium succinate on heating will be converted in stages to a succinamic acid salt, succinamide and succinimide and that these reactions are all reversible. In our invention, by adding ammonium succinamate, succinamic acid, succinamide or succinimide to a solution of ammonium succinate in glycol, the above equilibria are drawn toward the left and resistivity changes are suppressed.

What is claimed is:

1. An electrolytic capacitor having at least one aluminum electrode coated with a dielectric oxide layer, an electrolyte contiguous with said electrode, said electrolyte consisting essentially of ammonium adipate in combination with a member from the group consisting of ammonium succinamate, succinamic acid, succinamide and succinimide, dissolved in a solvent consisting essentially of ethylene glycol and a minor amount of water, said member being in an amount sufficient to reduce the percent increase in resistivity with time at the operating temperature of the capacitor.

2. The electrolytic capacitor of claim 1 wherein said member is succinamic acid.